March 6, 1962     J. Z. DE LOREAN     3,023,637
TWO SPEED TRANSMISSION
Filed Nov. 26, 1958
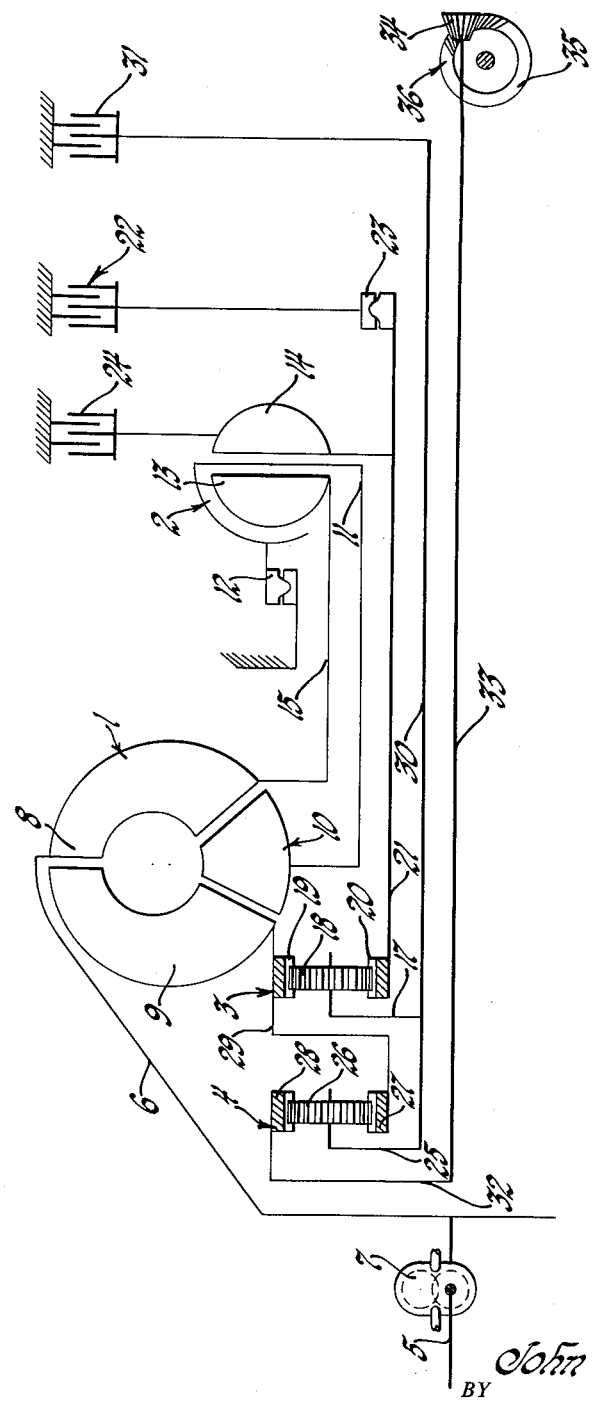
INVENTOR.
John Z. DeLorean
BY
R. L. Spencer
ATTORNEY

United States Patent Office 3,023,637
Patented Mar. 6, 1962

3,023,637
TWO SPEED TRANSMISSION
John Z. De Lorean, Birmingham, Mich., assignor to General Motors Corporation, Detroit, Mich., a corporation of Delaware
Filed Nov. 26, 1958, Ser. No. 776,535
9 Claims. (Cl. 74—677)

This invention relates to transmissions and more particularly to transmissions of the type incorporating planetary gearing systems in combination with hydrodynamic torque converters.

The transmission is particularly designed for use in an automotive vehicle and to be of a compact nature such that it may be installed in a confined space as behind the rear seat of the vehicle. To accommodate such an installation, the transmission is assembled with the planetary gearing system at the front of the transmission ahead of the torque converter and with a control coupling and control brakes behind the converter at the rear of the transmission. In this manner, minimum space is required at the front end of the transmission so that the gearing may be disposed adjacent the vehicle body behind the seat.

An object of this invention is to provide a transmission of the type incorporating a hydrodynamic torque converter and planetary gearing system which is of a simple design economical to construct and maintain, and is of a compact construction.

Another object of this invention is to provide a transmission of the type described wherein maximum torque multiplication may be had by driving a planetary gearing system through a hydrodynamic torque converter and wherein direct drive is achieved by driving one element of the gearing through the converter and another element of the gearing through a fluid coupling.

A further object of this invention is to provide a transmission of the type described wherein the planetary gearing system is disposed at one side of the torque converter and wherein the control elements for controlling the drive ratio are positioned at the opposite side of the torque converter.

An additional object of this invention is to provide a transmission of the type described including selectively operable brake means effective when engaged to downshift the gear unit to roduction drive and to prevent rotation of the fluid coupling turbine to provide efficient coast braking of the vehicle.

A further object of this invention is to provide a transmission of the type described wherein the planetary gearing system includes two gear units having the planet carriers of each unit fixed to each other for rotation as a unit and wherein the ring gear of one gear unit and the sun gear of the other gear unit are each driven directly by the torque converter turbine.

These and other objects of this invention will be apparent from the following description and claims taken in conjunction with the drawing in which:

The figure represents a schematic diagram of a transmission constructed in accordance with the principles of this invention.

Referring to the drawing there is shown a schematic diagram of a transmission constructed in accordance with the principles of this invention including a hydrodynamic torque converter indicated generally at 1, a fluid coupling unit 2 and a pair of planetary gearing units 3 and 4. Torque converter 1 is provided with an impeller 8, a turbine 9 and a reaction member 10. Fluid coupling 2 is provided with an impeller 13 and a turbine 14. Impeller 13 is connected to impeller 8 by a drive connection 15, both of the impellers 8 and 13 being driven by a drive shaft 5 through a drive connection 6. A pump 7 is driven by drive shaft 5 to provide a source of fluid pressure for control purposes. A one-way brake 12 is connected to torque converter reaction member 10 by a connection 11, the connection 11 extending inside the drive connection 15 and extending through coupling 2 between impeller 13 and turbine 14 to the one-way brake 12. Brake 12 prevents reverse rotation of reaction member 10 and permits forward rotation thereof.

Gear unit 3 includes a planet carrier 17 having a planet pinion gear 18 journalled therein and in mesh with a ring gear 19 and a sun gear 20. A drive connection 21 disposed within the connection 11 connects sun gear 20 for rotation with turbine 14 of fluid coupling 2. An engageable and releasable brake 22 and a one-way brake 23 are connected in series such that one-way brake 23 is effective to prevent reverse rotation of sun gear 20 and turbine 14 and to permit forward rotation of sun gear 20 and turbine 14 when brake 22 is engaged. In the event that brake 22 is released, one-way brake 23 will be ineffective to ground the shaft 21 and sun gear 20 and turbine 14 so that the turbine and sun gear will be permitted to spin freely. A two-way brake 24 associated with turbine 14 is normally released but may be engaged to prevent rotation of turbine 14 and sun gear 20 either forwardly or reversely.

Gear unit 4 includes a planet carrier 25 having a pinion gear 26 journalled therein and in mesh with a sun gear 27 and a ring gear 28. Sun gear 27 is connected to ring gear 19 of gear unit 3 to turbine 9 by a drive connection 29 such that turbine 9, ring gear 19 and sun gear 27 all rotate as a unit. Planet carriers 25 and 17 are each connected to an engageable and releasable two-way brake 31 through a connection 30 extending through connection 21. When brake 31 is engaged, planet carriers 17 and 25 are held against rotation. Ring gear 28 is connected to an output shaft 33 through a drive connection 32, the shaft 33 driving a pinion gear 34 in mesh with a ring gear 35 of a differential gear unit 36 for driving the vehicle axis, not shown.

The various brakes and fluid coupling unit 2 may be controlled by fluid under pressure supplied by pump 7 under control of suitable valving, not shown. The admission of fluid pressure to the brakes 22, 24 and 31 may be under control of a manually operated valve, not shown, which may be positioned by the vehicle driver to selectively engage the brakes. The control of the admission of fluid to an exhaust of pressure from the fluid coupling 2 may be had by means of a shift valve, not shown, which is normally biased to connect the coupling to exhaust and may be moved by a speed responsive governor, not shown, to admit fluid to coupling 2 when a predetermined vehicle speed is obtained. For example, the governor, not shown, may be driven by output shaft 33 so as to be responsive to vehicle speed. If desired, an overcontrol may be actuated in response to movement of the vehicle accelerator pedal, not shown, to move the fluid coupling shift valve, not shown, to empty the coupling of fluid in spite of the effect of the governor to position the shift valve to fill the coupling of fluid.

*Operation Neutral*

For neutral or no drive operation, brakes 22, 24 and 31 are released. Assuming the vehicle to be standing still, the fluid coupling 2 will be empty of working fluid. Rotation of drive shaft 5 will cause rotation of impellers 8 and 13. Due to the fact that coupling 2 is empty of working fluid no torque can be transmitted through the coupling. Turbine 9 will be rotated by working fluid in torque converter 1, thereby driving ring gear 19 and sun gear 27. Due to the load of the vehicle on ring gear 28, ring gear 28 will tend to remain stationary. Sun gear 20 of gear unit 3 and planet carrier 17 of gear unit 3 and planet carrier 25 of gear unit 4 are free to rotate and spin freely in response to rotation of ring gear 19 and sun gear 27. Since no reaction point is provided in either gear unit, no torque can be transmitted to ring gear 28 and output shaft 33. The engine may be raced for quick warm up without driving the vehicle.

*Operation Forward Drive—Reduction*

Assuming that the vehicle is standing still and the driver desires to start the vehicle in motion, the manual valve, not shown, is moved from its position wherein brakes 22, 24 and 31 are connected to exhaust to a position wherein fluid pressure is directed to brake 22 to engage the same. Fluid coupling 2 will be empty of fluid. With increase in speed of rotation of impeller 8, circulating working fluid in converter 1 will be effective to rotate turbine 9 to drive the ring gear 19 and sun gear 27 in the same direction of rotation of impeller 8. Due to the direction of angularity of the blades on reaction member 10, the reaction member will tend to rotate in reverse. Such rotation is prevented by one-way brake 12 which prevents reverse rotation of reaction member 10 but may permit forward rotation thereof. Assuming clockwise rotation of drive shaft 5 as indicated by the arrow, impeller 8 and impeller 13 will rotate clockwise at the speed of rotation of shaft 5. Turbine 9, ring gear 19 and sun gear 27 will rotate clockwise at the speed of rotation of turbine 9. Due to the load of the vehicle on ring gear 28, gear 28 will tend to remain stationary. Clockwise rotation of ring gear 19 will cause clockwise rotation of pinion gear 18, the pinion gear 18 in turn tending to spin sun gear 20 counterclockwise or in reverse. Such reverse rotation of sun gear 20 is prevented by one-way brake 23 and brake 22. With sun gear 20 held against rotation, planet gear 18 walks around sun gear 20 in a clockwise or forward direction driving planet carrier 17 and planet carrier 25 fixed to planet carrier 17 forwardly. Sun gear 27 is rotated in a clockwise or forward direction at the speed of rotation of turbine 9. Forward or clockwise rotation of sun gear 27 causes pinion gear 26 to rotate counterclockwise tending to drive ring gear 28 counterclockwise or in reverse. The gear ratios of the gear units depends upon the number of teeth in the sun gear and ring gear of each unit. For example, the ring gears 19 and 28 may be provided with 74 teeth each and the sun gears 20 and 27 may be provided with 31 teeth each. Assuming that sun gear 20 is held stationary, the carriers 17 and 25 are each driven forwardly or clockwise $74/105$ the speed of rotation of ring gear 19. Now assuming that in a given instant carriers 17 and 25 are momentarily held stationary, ring gear 28 will be rotated in reverse $31/74$ of a revolution for each revolution of sun gear 27. Considering the sun gear 27 to be held stationary for a given instant, the ring gear 28 will be rotated forwardly $105/74$ revolutions for each revolution of carrier 28. As stated, the carriers 17 and 25 are actually driven forwardly $74/105$ of a revolution for each revolution of ring gear 19. Due to the reduction drive of the carriers by gear unit 3 and the overdrive effect of gear unit 4 on ring gear 28, the ring gear 28 would be driven one revolution forward for each revolution of ring gear 19 were it not for the reverse drive effect of the drive through sun gear 27 and pinion gear 26. The net forward drive of ring gear 28 is $$\frac{74}{74} \text{ minus } \frac{31}{74} \text{ or } \frac{43}{74}$$

The gear reduction in low gear drive is therefore approximately 1.72 to 1.71.

*Operation—Forward Drive Direct*

As the vehicle speeds up in reduction drive, the control valve, not shown, is moved by the vehicle speed responsive governor, not shown, to admit working fluid to fluid coupling unit 2. With the coupling filled with fluid, turbine 14 is effective to drive sun gear 20 at substantially the speed of rotation of impeller 13 and impeller 8. At this time, turbine 9 will be rotating at substantially the same speed of rotation as impellers 8 and 13 so that ring gear 19 will also be rotating at substantially the same speed of rotation as that of the impellers. With this condition of operation, both ring gear 19 and sun gear 20 will be rotated at substantially engine shaft speed, thereby locking up gear unit 3 in direct drive so that planet carriers 17 and 25 are driven at substantially engine shaft speed. With sun gear 27 and carrier 25 of gear unit 4 each rotating at substantially engine shaft speed, gear unit 4 is in effect locked up so that ring gear 28 and output shaft 33 are driven at substantially engine shaft speed or in direct drive. There will of course be some slip losses of a minor nature in the torque converter and fluid coupling.

*Coast Braking*

In the description so far set forth, it will be apparent that little engine braking can be obtained when the vehicle tends to overrun the engine. Should this occur when forward brake 22 is the only brake applied, one-way brake 23 will release to permit sun gear 20 to rotate freely forwardly so that the vehicle freewheels without transmitting torque from the output shaft to the drive shaft for engine braking. To provide a coast brake for braking the vehicle without use of the normal vehicle wheel brakes the coast brake 24 may be applied by moving the manual drive range control valve, not shown, to direct fluid pressure to brake 24 to engage the same. With brake 24 engaged, turbine 14 and sun gear 20 are held against rotation. This establishes reduction drive in the planetary gearing system such that output shaft 33 tends to drive turbine 9 at a relatively high speed of rotation when the vehicle is overrunning the engine. This causes the turbine 9 to tend to circulate fluid in the converter in a direction opposite to the direction of fluid flow as imparted to the fluid by the impeller such that the idling engine is effectively connected to the output shaft 33 and can act as a brake on the vehicle. In addition, assuming that fluid coupling 2 is filled with working fluid, considerable turbulence will be set up in the coupling unit due to rotation of impeller 13. The coupling unit therefore is able to absorb energy and provides a hydrodynamic brake for further braking the vehicle. Coast brake 24 is normally released and is primarily used for vehicle braking when descending long or steep grades to assist the vehicle wheel brakes or to control the vehicle speed such that use of the vehicle wheel brakes may be dispensed with.

*Reverse drive*

To provide reverse vehicle drive, brakes 22 and 24 are released and brake 31 engaged. This may be done by moving the manual drive range selector valve, not shown, to connect brakes 22 and 24 to exhaust and to direct fluid pressure to brake 31 to engage the same. Application of brake 31 holds planet carriers 17 and 25 against rotation. Assuming that impeller 8 is rotated at a sufficient speed to cause rotation of ring gear 19 and sun gear 27, planet pinion 18 will cause sun gear 20 to spin freely in reverse. Since gear unit 3 has no reaction point, no torque is transmitted through that gear unit. With the planet carrier 25 held against rotation, forward rotation of sun gear 27 will cause reverse rotation of pinion gear 26, the pinion gear 26 driving ring gear 28 and output shaft 33 in reduction drive in reverse. In the example given, the gear ratio in reverse is approximately 2.39 to one.

The transmission is particularly designed to be of a compact nature so as to be easily positioned fore and aft of the vehicle and behind the seat of the vehicle in the rear portion of the vehicle. The arrangement of the gear units forward of the converter and the fluid coupling and control brakes to the rear of the converter makes for a very compact design particularly adapted for use where space requirements are stringent. The provision of the two gear units provides for adequate torque multiplication for start, while the split torque arrangement wherein a portion of the power input is through the converter and a portion through the fluid coupling in direct drive results in a transmission which is highly efficient in direct drive. The coast brake feature is very advantageous when encounternig a hilly or mountainous driving conditions. It will be apparent that the gear units are of a relatively small diameter as compared to that of the coupling so that the transmission may be installed with the gearing adjacent the vehicle body and closely adjacent to the vehicle rear seat.

I claim:

1. A transmission comprising in combination, a hydrodynamic torque converter having an impeller driven by an engine driven drive shaft, a turbine and a reaction member, a fluid coupling unit of the type adapted to be alternately filled with and emptied of working fluid and having an impeller and a turbine, means including a first hollow sleeve shaft connecting said fluid coupling impeller to said torque converter impeller for rotation therewith, a planetary gearing system including first and second gear units, said first gear unit having a planet carrier supporting a pinion gear in mesh with a ring gear and a sun gear, said second planetary gearing unit having a planet carrier supporting a planet pinion in mesh with a ring gear and a sun gear, means drivingly connecting said first gear unit ring gear and said second gear unit sun gear to said torque converter turbine for rotation therewith as a unit, means connecting said planet carriers to each other for rotation as a unit, an output shaft extending through said first hollow sleeve shaft and connected for rotation as a unit with said second gear unit ring gear, a second hollow sleeve shaft extending through said first hollow sleeve shaft and fixed to said first gear unit sun gear and said fluid coupling turbine for rotation therewith as a unit, and one-way brake means effective to prevent reverse rotation of said second hollow sleeve shaft and first gear unit sun gear when said fluid coupling unit is emptied of working fluid to establish reduction drive through said converter and both of said gear units, said one-way brake means being effective to permit forward rotation of said first gear unit sun gear to permit forward drive of said first gear unit sun gear by said fluid coupling turbine when said fluid coupling unit is filled with working fluid, said gear units being disposed forwardly of said converter, said fluid coupling unit being disposed rearwardly of said converter, and said brakes being disposed rearwardly of said converter.

2. A transmission comprising in combination, a hydrodynamic torque converter having an impeller driven by an engine driven drive shaft, a turbine and a reaction member, a fluid coupling unit of the type adapted to be alternately filled with and emptied of working fluid and having an impeller and a turbine, a drive connection between said fluid coupling impeller and said torque converter impeller including a first hollow sleeve shaft, a planetary gearing system including first and second gear units, said first gear unit including a planet carrier supporting a pinion gear in mesh with a ring gear and a sun gear, said second gear unit including a planet carrier supporting a planet pinion gear in mesh with a ring gear and a sun gear, a drive connection for connecting said first gear unit ring gear and said second gear unit sun gear to said torque converter turbine, an output shaft extending through said first hollow sleeve shaft, a drive connection between said second gear unit ring gear and said output shaft, means including a second hollow sleeve shaft extending through said first hollow sleeve shaft connecting said first gear unit sun gear to said fluid coupling turbine, means connecting said planet carriers to each other for rotation as a unit including a third hollow sleeve shaft extending through said second hollow sleeve shaft, an engageable and releasable brake effective when engaged to prevent rotation of said third hollow sleeve shaft and both of said carriers to establish reverse drive through said planetary gearing, means for preventing reverse rotation of said second hollow sleeve shaft and first gear unit sun gear and for permitting forward rotation thereof including a one-way brake and an additional engageable and releasable brake connected in series, said fluid coupling impeller being effective to impart forward rotation to said second sleeve shaft and first gear unit sun gear when said coupling is filled with working fluid, said additional engageable and releasable brake being effective when said fluid coupling is empty and said additional brake is released to render said one-way brake ineffective to prevent reverse rotation of said second sleeve shaft and first gear unit sun gear to establish a neutral condition of operation in said transmission, both of said gear units being disposed forwardly of said torque converter, and said fluid coupling and said brakes being disposed rearwardly of said converter on the side of said converter opposite said gearing units.

3. A transmission comprising in combination, a hydrodynamic torque converter having an impeller driven by a drive shaft, a turbine and a reaction member, a fluid coupling unit of the type adapted to be alternately filled with and emptied of working fluid and having an impeller and a turbine, means including a first hollow sleeve shaft connecting said fluid coupling impeller to said torque converter impeller for rotation therewith as a unit, a planetary gearing system including first and second gear units, said first gear unit having a planet carrier supporting a planet pinion in mesh with a sun gear and a ring gear, said second planetary gearing unit having a carrier supporting a planet pinion in mesh with a sun gear and a ring gear, means connecting said first gear unit ring gear and said second gear unit sun gear to said torque converter turbine for rotation as a unit, means including a second hollow sleeve shaft extending through said first hollow sleeve shaft connecting said first gear unit sun gear to said fluid coupling turbine for rotation as a unit, means including a third shaft extending through said second hollow sleeve shaft connecting said second gear unit ring gear to an output shaft, means operative upon said second sleeve shaft for preventing reverse rotation of said second sleeve shaft and said first gear unit sun gear to establish forward drive when said fluid coupling is emptied of working fluid and to permit forward rotation of said coupling turbine and said first gear unit sun gear when said fluid coupling is filled with working fluid including a one-way brake and an additional engageable and releasable brake connected in series, said additional brake being effective when released to render said one-way brake ineffective to prevent rotation of said second sleeve shaft and first gear unit sun gear to establish a neutral condition of transmission operation, and a third brake associated with said fluid coupling turbine effective when engaged to prevent rotation of said fluid coupling turbine, said second sleeve shaft and said first gear unit sun gear to establish reduction drive in said gearing system and hydrodynamic braking in said fluid coupling, means connecting said planet carriers to each other for rotation as a unit including a third hollow sleeve shaft extending through said second hollow sleeve shaft, and a fourth engageable and releasable brake effective when engaged to prevent rotation of said third hollow sleeve shaft and both of said planet carriers to establish reverse drive through said gearing, both of said gear units being disposed forwardly of said torque converter, said fluid coupling and said brakes being disposed rearwardly of said converter on the side of said converter opposite said gearing units.

4. A transmission comprising in combination, a hydrodynamic torque converter having an impeller, a turbine and a reaction member, a fluid coupling unit of the type adapted to be alternately filled with and emptied of working fluid and having an impeller and a turbine, a drive shaft connected to said torque converter impeller for driving the same, means including a first hollow sleeve shaft connecting said fluid coupling impeller to said torque converter impeller for rotation therewith as a unit, a planetary gearing system including first and second gear units, each of said gear units including a planet carrier supporting a planet pinion gear in mesh with a sun gear and a ring gear, means connecting one of said sun gears and one of said ring gears to said torque converter turbine for rotation as a unit, means connecting another of said ring gears to an output shaft, said output shaft extending through said first hollow sleeve shaft, means including a second hollow sleeve shaft extending through said first hollow sleeve shaft connecting the other of said sun gears to said fluid coupling turbine for rotation as a unit, means for preventing reverse rotation of said second hollow sleeve shaft, said last-mentioned sun gear and said fluid coupling turbine and for permitting forward rotation thereof including a one-way brake and an engageable and releasable brake connected in series, said last-mentioned brake being effective when released to render said one-way brake inoperative to thereby establish a neutral condition of transmission operation when said fluid coupling is empty of working fluid, said fluid coupling being effective when filled with working fluid to drive said second hollow sleeve shaft and the sun gear connected thereto to establish direct drive in the gearing, and an additional engageable and releasable brake associated with said fluid coupling turbine effective when engaged to prevent rotation of said turbine, said second sleeve shaft and the sun gear connected thereto to establish overrun coast braking when said output shaft tends to overrun said drive shaft, means including a third hollow sleeve shaft extending through said second hollow sleeve shaft connecting both of said planet carriers to each other for rotation as a unit, and an engageable and releasable brake effective when engaged to prevent rotation of said third hollow sleeve shaft and both of said planet carriers to establish reverse drive through said gearing, both of said gear units being disposed at one side of said converter and said fluid coupling and all of said brakes being disposed at the opposite side of said converter.

5. A transmission comprising in combination, a hydrodynamic torque converter having an impeller, a turbine and a reaction member, a fluid coupling unit of the type adapted to be alternately filled with and emptied of working fluid and having an impeller and a turbine, a means including a first hollow drive shaft connected to said impellers for rotating the same as a unit, a planetary gearing system including first and second gear units, each of said gear units including a planet carrier supporting a planet pinion in mesh with a sun gear and a ring gear, means connecting one of said sun gears and one of said ring gears to said torque converter turbine for rotation as a unit, means including a second hollow shaft extending through said first hollow drive shaft connecting said planet carriers to each other for rotation as a unit, means including a third shaft extending through said second hollow shaft connecting the other of said ring gears to an output shaft, means including an additional hollow shaft extending through said first hollow shaft connecting said fluid coupling turbine to the other of said sun gears for rotation as a unit, means for selectively establishing neutral or forward drive condition of transmission operation including a one-way brake and an additional brake connected in series, said one-way brake being effective when said additional brake is engaged to prevent reverse rotation of said fluid coupling turbine and said additional hollow shaft and the sun gear connected thereto and to permit forward rotation thereof, said additional brake being effective when released to render said one-way brake ineffective, and means for establishing reverse drive of said output shaft comprising an engageable and releasable brake connected to said second hollow shaft and effective when engaged to prevent rotation of both of said planet carriers, both of said gear units being disposed at one side of said converter, said coupling and brakes being disposed at the opposite side of said converter from said gear units.

6. A transmission comprising in combination, a hydrodynamic torque converter unit, a fluid coupling unit adapted to be alternately filled with and emptied of working fluid and a planetary gearing system, said torque converter unit including an impeller, a turbine and a reaction member, said fluid coupling unit including an impeller and a turbine means including a first hollow sleeve shaft connecting said impellers to a drive shaft for rotation therewith, means including a second hollow sleeve shaft extending through said first hollow sleeve shaft and fixed for rotation as a unit with said torque converter reaction member, one-way brake means for preventing reverse rotation of said second hollow sleeve shaft and said torque converter reaction member and for permitting forward rotation thereof, said planetary gearing system including a first gear unit having a planet carrier supporting a planet pinion in mesh with a ring gear and a sun gear and a second gear unit having a planet carrier supporting a planet gear in mesh with a ring gear and a sun gear, means connecting the ring gear of the first gear unit to the sun gear of the second gear unit, means including a third hollow sleeve shaft extending through said second hollow sleeve shaft for connecting the sun gear of the first gear unit to said fluid coupling turbine, means for preventing reverse rotation of said first gear unit sun gear and said fluid coupling turbine and for permitting forward rotation thereof including a one-way brake operable upon said third hollow sleeve shaft and an engageable and releasable two-way brake connected in series, an additional engageable and releasable two-way brake effective when engaged to prevent rotation of said fluid coupling turbine and first gear unit sun gear, means, including a fourth hollow sleeve shaft extending through said third hollow sleeve shaft connecting the planet carriers of said first and second gear units to each other for rotation as a unit, means including a fifth shaft extending through said fourth hollow sleeve shaft connecting the ring gear of said second gear unit to an output shaft, and an engageable and releasable brake effective when engaged to prevent rotation of said fourth hollow sleeve shaft, both of said gear units being disposed forwardly of said converter, said coupling and said brakes being disposed rearwardly of said converter.

7. A transmission comprising in combination, an engine driven drive shaft, a hydrodynamic torque converter having an impeller driven by said drive shaft, a turbine and a reaction member, a planetary gearing system disposed between said converter and said drive shaft at one side of said converter, drive ratio control means including a fluid coupling unit of the type adapted to be filled and emptied of working fluid and a plurality of selectively operable brakes disposed adjacent said converter on the opposite side of the converter from said gearing system, said fluid coupling unit including an impeller and a turbine, a first hollow sleeve shaft connecting said converter impeller to said fluiding coupling impeller for rotation therewith as a unit, a second hollow sleeve shaft fixed to said converter reaction member for rotation therewith and extending through said first sleeve shaft, an extension on said second sleeve shaft extending radially outwardly between said fluid coupling impeller and said fluid coupling turbine, one way brake means operable upon said extension for preventing reverse rotation of said second hollow sleeve shaft and for permitting forward rotation thereof, said gearing system including first and second gear units, said first gear unit including a planet carrier having a planet gear journalled therein and in mesh with a sun gear and a ring gear, means for preventing reverse rotation of said sun gear and for permitting forward rotation thereof including a third hollow sleeve shaft extending through said second hollow sleeve shaft and connecting said sun gear to said fluid coupling turbine for rotation therewith, said means also including a one way brake operably associated with said third hollow sleeve shaft and a two way brake in series with said one-way brake, said second gear unit including a planet carrier supporting a planet pinion in mesh with a ring gear and a sun gear, means including a fourth hollow sleeve shaft extending through said third hollow sleeve shaft connecting said carriers to each other for rotation as a unit, selectively operable means for preventing rotation of said fourth hollow sleeve shaft, means connecting the ring gear of the first gear unit to the sun gear of the second gear unit and to said converter turbine for rotation as a unit, means including a fifth shaft extending through said fourth hollow sleeve shaft connecting the ring gear of the second gear unit to an output shaft, both of said gear units being disposed forwardly of said converter, said coupling and said brakes being disposed rearwardly of said converter on the side of said converter opposite said gear units.

8. A transmission comprising in combination, a torque converter having an impeller driven by an engine driven drive shaft, a turbine and a reaction member, one-way brake means for preventing reverse rotation of said reaction member and for permitting forward rotation thereof, a planetary gearing system including first and second gear units disposed at one side of said converter between said converter and drive shaft, a drive ratio control coupling of the type adapted to be alternately filled with and emptied of working fluid disposed at the opposite side of the converter from the gearing system and having an impeller and a turbine, means including a first hollow sleeve shaft connecting said coupling impeller to said converter impeller for rotation therewith, said one way brake means comprising a second hollow shaft extending through said first hollow shaft and fixed to said converter reaction member for rotation therewith, a flange on said second hollow shaft extending radially outwardly between said fluid coupling impeller and turbine, and a one way brake operatively associated with said flange each of said gear units having a planet carrier supporting a pinion gear in mesh with a ring gear and a sun gear, means including an additional hollow shaft extending through said second hollow shaft connecting the planet carriers of said gear units to each other for rotation as a unit, a drive connection for connecting the sun gear of the second gear unit and the ring gear of the first gear unit to said torque converter turbine, a drive connection between said first gear unit sun gear and said coupling turbine, a drive connection between said second gear unit ring gear and an output shaft including a fourth shaft extending through said additional hollow shaft, means including a one-way brake for preventing reverse rotation of said first gear unit sun gear and for permitting forward rotation thereof, said means also including a further hollow shaft fixed for rotation with said sun gear and extending through said first hollow shaft and between said second hollow shaft and said additional hollow shaft, said one way brake means being operative upon said further hollow shaft to prevent rotation thereof in one direction and to permit rotation thereof in the opposite direction, and an engageable and releasable brake operable upon said additional hollow shaft for preventing rotation of said planet carriers, all of said brakes being disposed at the opposite side of said converter from said gearing system.

9. A transmission comprising in combination, a torque converter having an impeller driven by an engine driven drive shaft, a turbine and a reaction member, a planetary gearing system including first and second gear units disposed in the front portion of the transmission between the converter and the drive shaft, a drive ratio control coupling of the type adapted to be alternately filled with and emptied of working fluid disposed to the rear of the converter on the side of the converter opposite the gearing system and having an impeller and a turbine, means including a first hollow shaft connecting the coupling impeller to the converter impeller for rotation therewith, means for preventing reverse rotation of said turbine reaction member and for permitting forward rotation thereof including a second hollow shaft extending through said first hollow shaft and fixed for rotation with said turbine reaction member and a one-way brake and a ground connection from said brake to said second hollow shaft extending through said control coupling between the impeller and turbine of said coupling, each of said gear units including a planet carrier supporting a pinion gear in mesh with a ring gear and a sun gear, respectively, means including a third hollow shaft extending through said second hollow shaft connecting said first gear unit sun gear to said fluid coupling turbine for rotation therewith, means including a selectively engageable and releasable brake and a one-way brake for preventing reverse rotation of said third hollow shaft and said first gear unit sun gear and for permitting forward rotation thereof, means comprising a fourth hollow shaft extending through said third hollow shaft connecting the planet carriers of said first and second gear units to each other for rotation as a unit, a selectively engageable and releasable brake for preventing rotation of said fourth hollow shaft and said planet carriers, an additional selectively engageable and releasable brake for preventing rotation of said fluid coupling turbine, said third hollow shaft and said first gear unit sun gear, means connecting said second gear unit sun gear and said first gear unit ring gear to said torque converter turbine for rotation therewith, and means including an additional shaft extending through said fourth hollow shaft connecting said second gear unit ring gear to an output shaft, all of said brakes being disposed rearwardly of the converter on the side of the converter opposite from the gearing system.

References Cited in the file of this patent
UNITED STATES PATENTS

| | | |
|---|---|---|
| 2,748,622 | Syrovy et al. | June 5, 1956 |
| 2,797,594 | Grattan | July 2, 1957 |
| 2,861,474 | Moore | Nov. 25, 1958 |
| 2,861,476 | Russell | Nov. 25, 1958 |
| 2,919,604 | De Lorean | Jan. 5, 1960 |

UNITED STATES PATENT OFFICE
CERTIFICATE OF CORRECTION

Patent No. 3,023,637                        March 6, 1962

John Z. De Lorean

It is hereby certified that error appears in the above numbered patent requiring correction and that the said Letters Patent should read as corrected below.

Column 1, line 46, for "roduction" read -- reduction --; column 2, line 40, for "axis" read -- axle --; column 3, line 68, for "1.71." read -- 1. --.

Signed and sealed this 26th day of June 1962.

(SEAL)
Attest:

ERNEST W. SWIDER
Attesting Officer

DAVID L. LADD
Commissioner of Patents